Sept. 25, 1923.
H. J. CALDWELL
INSERTED TOOTH CUTTER
Filed May 27, 1921
1,468,774
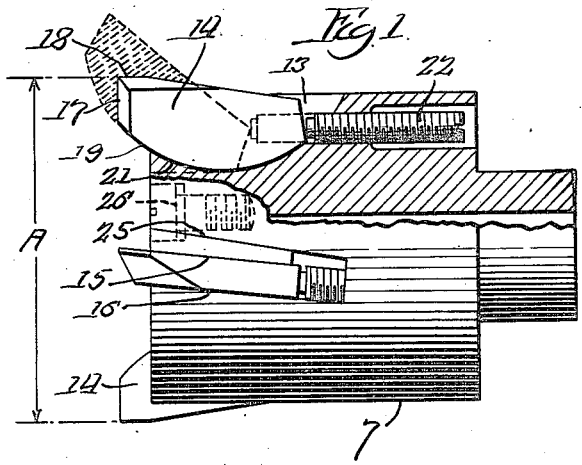
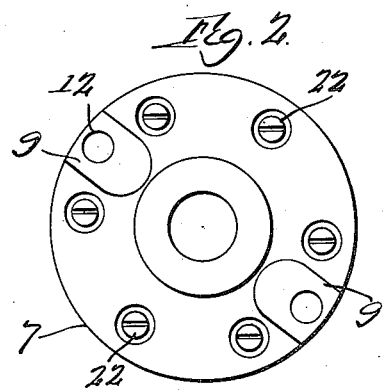
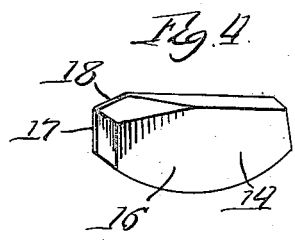
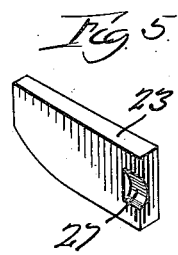
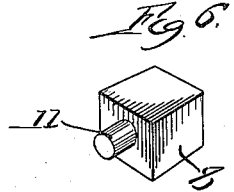
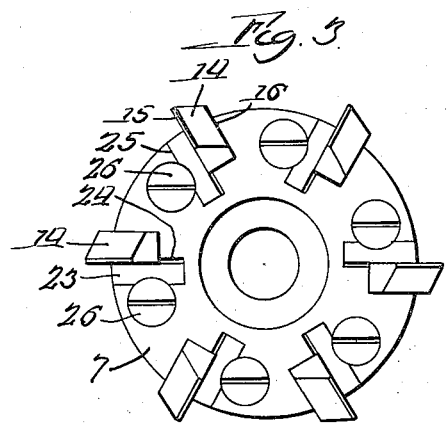
Inventor
Harry J. Caldwell
By Lee J. Wilson
Atty.

Patented Sept. 25, 1923.

1,468,774

UNITED STATES PATENT OFFICE.

HARRY J. CALDWELL, OF ROCKFORD, ILLINOIS, ASSIGNOR TO THE INGERSOLL MILLING MACHINE COMPANY, OF ROCKFORD, ILLINOIS, A CORPORATION OF ILLINOIS.

INSERTED-TOOTH CUTTER.

Application filed May 27, 1921. Serial No. 473,058.

*To all whom it may concern:*

Be it known that I, HARRY J. CALDWELL, a citizen of the United States, residing at Rockford, in the county of Winnebago and State of Illinois, have invented certain new and useful Improvements in Inserted-Tooth Cutters, of which the following is a specification.

This invention pertains in general to milling cutters, and has more particular reference to those of the inserted-tooth type. In this class, it is common practice to adjust the teeth longitudinally of the cutter axis, generally by means of straight inclined surfaces, to project the end and side cutting edges to provide for wear and the necessary regrinding. In all prior constructions, so far as I am aware, this longitudinal projection of the teeth is considerably greater than the radial projection, and inasmuch as the greatest wear is on the longitudinal or side cutting edges the life of a milling cutter of a given diameter is relatively short. Furthermore, such constructions have certain limitations prohibiting their use in comparatively small diameter cutters for heavy-duty work.

The primary object of the present invention is to overcome these limitations by the provision of a novel insert-tooth milling cutter in which a greater portion of the teeth may be used for a given diameter than is possible with prior constructions, consequently greatly increasing the life of the cutter.

Another object is to provide an inserted tooth milling cutter embodying such characteristics as to give a more practical and durable cutter construction in small diameters than is possible with conventional cutters of this type.

In furtherance of these general objects I have provided a unique means for adjustably mounting and securing the cutting teeth in a mill body, whereby upon adjustment of the teeth their end and side cutting edges will be projected to substantially the same degree, although preferably the side cutting edges are projected to a greater degree than the end cutting edges, thereby permitting the use after repeated regrinding, of a greater portion of the teeth for a given diameter than is possible with prior constructions.

I have also aimed to provide a simple and novel means for locking the teeth in the mill body.

Other objects and attendant advantages will be appreciated by those familiar with this art as the invention becomes better understood by reference to the following description when considered in connection with the accompanying drawings, in which—

Figure 1 is a side view partly in section, of an inserted toothed milling cutter embodying my invention;

Figs. 2 and 3, rear and face end views, respectively, of the milling cutter; and Figs. 4, 5 and 6, perspective views of one of the cutting teeth, wedge blocks and drive keys, respectively, used in my improved mill.

The mill body per se designated generally by character 7, is preferably of the conventional cylindrical form and may be connected to a driving spindle in any suitable manner, such for example as by a central bolt, not shown. Driving connection between the spindle and mill is established by means of key blocks 8, removably fitted in key sockets 9 in the mill body. Locating pins 11 adapted to fit in holes 12 in the mill body, hold the key blocks against displacement.

The mill body is shaped to provide a plurality of circumferentially spaced sockets designated generally by character 13, for the reception of the cutting teeth 14 also designated generally. Each tooth has parallel front and back sides 15 and 16 respectively, and is beveled at one end and side providing the proper clearance for the end and side cutting edges 17 and 18 respectively. In the present instance, these cutting edges are disposed at approximately a 90-degree angle, but it will be readily understood that the projecting end of the tooth may be shaped to suit the requirements of the particular work at hand. The inner side 19 of each tooth is a segment of a true circle; and the inner wall 21 of the socket 13 has a correspondingly curved surface, so that the tooth may be guided by the curved mill surface in an arcuate path to project its cutting end more or less from the face of the mill body. As shown in Fig. 3, the teeth are substantially radially disposed, and as shown in Fig.

1, the teeth are angled with respect to the longitudinal axis of the mill, providing the desired pitch. A suitable adjusting screw 22 threadingly engaged in the mill body in longitudinal alignment with each blade and accessible for adjustment at the rear end of the mill, serves as an end thrust abutment for its respective cutting tooth. Each tooth is adapted to be rigidly secured and locked in its respective mill socket by means of a wedge block 23, which fits in a socket 24 contiguous to the socket 16 in the mill body. The wall 25 of each socket 24 is inclined with respect to the opposed wall 16 of the tooth socket, providing a taper complemental to that of its respective wedge block. Each block is adapted to be forced longitudinally by a set screw 26 threadingly engaged in the mill body and bearing against the seat 27 on the wedge, for wedgingly securing and locking its respective cutting tooth in the mill body, as will be obvious.

In practice, it will be assumed that the milling cutter shown is to be used on a surface milling production job in which the side edges 18 take the heaviest cut and consequently wear more quickly than the edges 17 and require more frequent grinding. It will likewise be assumed that it is desired to maintain or adhere as closely as possible to the diameter A during a long period of service. This can be done with a construction of the character disclosed herein, while in prior constructions it is impossible, due to certain inherent characteristics in the design. It is further desired to obtain longevity in cutters of this kind, especially those of relatively small diameter in which the teeth while being radially adjustable are quite restricted for regrinding and consequently are comparatively short lived, as regards maintaining a given diameter. In the present case it will be observed that by adjusting the teeth in an arcuate path as shown, a considerable portion of the tooth body may be used while still maintaining the diameter A. This adjustment is obtained as will be readily understood by loosening the set screws 26 and feeding the screws 22 inwardly. In Fig. 1, such an adjustment is shown in dotted lines, from which it will be apparent that the sectioned portion has been ground off, still leaving a sufficiently large tooth body to insure rigid clamping in the mill. This adjustment clearly illustrates that a considerably greater radial projection of teeth is allowed in a comparatively small diameter mill than is possible with prior constructions. It follows that the life of a milling cutter of this kind is correspondingly increased.

It is believed that the foregoing conveys a clear understanding of the objects prefaced above, and while I have shown in the drawing but a single working embodiment of my invention it should be understood that the same is capable of considerable change and modification without departing from the spirit and scope of the invention as expressed in the appended claims.

I claim:

1. An inserted tooth milling cutter, comprising a cylindrical mill body having circumferentially spaced tooth sockets radially disposed and intersecting the periphery in a plane inclined with respect to the longitudinal axis of said body and having an internally threaded bore in alignment with and intersecting each tooth socket and reaching to the end of the mill body remote from its tooth socket end, a cutter tooth in each socket having an inner arcuate edge seating on the bottom of its socket, a screw in each threaded bore bearing at one end against its respective tooth and adapted to be turned from its opposite end for advancing its tooth longitudinally, and means for rigidly securing the teeth in the mill body.

2. An inserted tooth milling cutter, comprising a cylindrical mill body, cutter teeth, a backing screw for each tooth, each tooth and its backing screw being supported in the mill body in longitudinal alignment in a plane inclined with respect to the longitudinal axis of said body and with the cutters radially disposed in circumferentially spaced relation, each tooth having a side and an end cutting edge, said screws adapted to be turned from the end of the mill body remote from the cutter end for projecting said cutting edges from the mill body, and means for causing by such advancement of the teeth their side edges to be radially projected to a greater degree than longitudinal projectment of their end edges.

3. An inserted tooth milling cutter, comprising a cylindrical mill body having circumferentially spaced tooth sockets radially disposed, intersecting its periphery and extending in a plane inclined with respect to its longitudinal axis and having also a wedge block socket contiguous to each tooth socket with the longitudinal side of said wedge socket inclined with respect to the opposed wall of the adjoining tooth socket, a flat body cutter tooth for each tooth socket having parallel front and back faces, side and end cutting edges at one end, and an inner segmental edge adapted to seat on the bottom wall of its socket and to project its side cutting edge radially and its end cutting edge longitudinally upon advancing the tooth longitudinally in its socket, means for so advancing each tooth, a wedge block in each wedge socket, and means for moving the wedge blocks longitudinally for rigidly clamping the teeth in the mill body.

4. An inserted tooth milling cutter, comprising a cylindrical mill body having circumferentially spaced tooth sockets radially disposed, intersecting its periphery and extending in a plane inclined with respect to its longitudinal axis and having also a wedge block socket contiguous to each tooth socket with the longitudinal side of said wedge socket inclined with respect to the opposed wall of the adjoining tooth socket, a flat body cutter tooth for each tooth socket having parallel front and back faces, side and end cutting edges at one end, and an inner segmental edge adapted to seat on the bottom wall of its socket and to project its side cutting edge radially and its end cutting edge longitudinally upon advancing the tooth longitudinally in its socket, a screw in longitudinal alignment with each cutter tooth, threadedly engaged in the mill body and accessible from the end thereof remote from the cutter end for advancing each cutter in its socket, a wedge block in each wedge socket movable longitudinally therein for rigidly securing its respective cutter tooth in the mill body, and means for so moving said wedge blocks.

5. An inserted tooth milling cutter comprising a mill body, inserted teeth each having an end and a side cutting edge, and means for adjusting the teeth upon and with respect to said body in such manner as to radially project said side edges to a greater degree than longitudinal projectment of the end edges.

6. In an inserted tooth milling cutter, the combination with a mill body having circumferentially spaced tooth sockets, of cutting teeth inserted in said sockets and having longitudinally curved inner faces seating on complemental curved faces at the bottom of said sockets and adapted to be adjusted thereon in an arcuate path whereby to radially project the outer end of the teeth to a greater degree than its longitudinal projectment.

HARRY J. CALDWELL.